(12) United States Patent
Wang

(10) Patent No.: US 11,003,850 B2
(45) Date of Patent: May 11, 2021

(54) METHOD AND SYSTEM FOR DESIGNING DISTRIBUTED DASHBOARDS

(71) Applicant: Prescient Devices, Inc., Groton, MA (US)

(72) Inventor: Andrew Wang, Groton, MA (US)

(73) Assignee: Prescient Devices, Inc., Groton, MA (US)

( * ) Notice: Subject to any disclaimer, the term of this patent is extended or adjusted under 35 U.S.C. 154(b) by 0 days.

(21) Appl. No.: 16/899,986

(22) Filed: Jun. 12, 2020

(65) Prior Publication Data

US 2020/0313961 A1 Oct. 1, 2020

Related U.S. Application Data

(63) Continuation-in-part of application No. 16/431,966, filed on Jun. 5, 2019, now Pat. No. 10,685,155.
(Continued)

(51) Int. Cl.
*G06F 40/205* (2020.01)
*H04L 12/24* (2006.01)
(Continued)

(52) U.S. Cl.
CPC .......... *G06F 40/205* (2020.01); *G06F 3/0484* (2013.01); *G06F 9/451* (2018.02); *H04L 41/0803* (2013.01); *G06F 8/38* (2013.01)

(58) Field of Classification Search
CPC .......... G06F 17/00; G06F 16/00; G06F 16/26; G06F 3/0484; G06F 8/38; G06F 9/451; G06F 9/54; G06F 40/205; H04L 41/0803
See application file for complete search history.

(56) References Cited

U.S. PATENT DOCUMENTS

| 5,640,546 A | 6/1997 | Gopinath et al. |
| 5,870,588 A | 2/1999 | Rompaey et al. |

(Continued)

OTHER PUBLICATIONS

International Searching Authority—Invitation to Pay Additional Fees—International Application No. PCT/US2019/035502 dated Aug. 21, 2019, together with the Provisional Opinion Accompanying the Partial Search Result, 14 pages.
(Continued)

*Primary Examiner* — Helen Rossoshek
(74) *Attorney, Agent, or Firm* — Sunstein LLP

(57) ABSTRACT

A computer-implemented method characterizes and controls performance of a set of device nodes in a distributed heterogeneous computing and control system. The device nodes are in physically distinct locations, in communication with one another over a network. One or more of the device nodes require different application programming code due to differences in hardware configuration or software configuration. The method includes configuring, by a design computer, for introduction into each distinct one of the device nodes, a corresponding communication facility and a corresponding dashboard instance. After introduction of the communication facility and dashboard instance into each device node, the design computer includes a communication facility in communication with the corresponding communication facility of each device node. Any given dashboard instance, either in the design computer or one of the device nodes, is configurable to display data and control elements associated with a selected one of the device nodes.

10 Claims, 13 Drawing Sheets

Related U.S. Application Data

(60) Provisional application No. 62/681,397, filed on Jun. 6, 2018, provisional application No. 62/741,326, filed on Oct. 4, 2018, provisional application No. 62/943,558, filed on Dec. 4, 2019, provisional application No. 62/945,600, filed on Dec. 9, 2019.

(51) Int. Cl.
*G06F 3/0484* (2013.01)
*G06F 9/451* (2018.01)
*G06F 8/38* (2018.01)

(56) References Cited

U.S. PATENT DOCUMENTS

| | | | |
|---|---|---|---|
| 5,878,408 A | 3/1999 | Van Huben et al. | |
| 6,339,836 B1 | 1/2002 | Eisenhofer et al. | |
| 6,681,866 B1 | 1/2004 | Raducha et al. | |
| 6,961,690 B1 | 11/2005 | Karchmer et al. | |
| 7,143,341 B1 | 11/2006 | Kohli | |
| 7,168,059 B2 | 1/2007 | Bowyer et al. | |
| 7,392,255 B1 | 6/2008 | Sholtis et al. | |
| 7,546,232 B2 | 6/2009 | Brooks et al. | |
| 7,546,571 B2 | 6/2009 | Mankin et al. | |
| 7,805,698 B1 | 9/2010 | Ferguson et al. | |
| 8,024,721 B2 * | 9/2011 | Matic | G06F 8/00 717/163 |
| 8,117,537 B1 | 2/2012 | Vell et al. | |
| 8,244,512 B1 | 8/2012 | Tseng et al. | |
| 8,548,992 B2 | 10/2013 | Abramoff et al. | |
| 8,577,664 B2 | 11/2013 | Batarseh et al. | |
| 8,812,974 B2 * | 8/2014 | Pourshahid | G06F 8/38 715/777 |
| 8,832,612 B1 | 9/2014 | O'Riordan et al. | |
| 9,031,824 B2 | 5/2015 | Nasle | |
| 9,182,948 B1 | 11/2015 | O'Riordan | |
| 9,201,994 B1 | 12/2015 | Tripathi et al. | |
| 9,240,002 B2 * | 1/2016 | Hume | G16H 10/60 |
| 9,261,950 B2 * | 2/2016 | Gu | G06F 3/01 |
| 9,335,977 B2 | 5/2016 | Wang et al. | |
| 9,521,209 B2 | 12/2016 | Lovisa et al. | |
| 9,563,878 B2 * | 2/2017 | Malyshev | G06Q 10/107 |
| 9,705,736 B2 | 7/2017 | Wang et al. | |
| 9,846,694 B1 | 12/2017 | Cook | |
| 10,068,054 B2 | 9/2018 | Van Rooyen et al. | |
| 10,313,361 B2 | 6/2019 | Ros-Giralt et al. | |
| 10,387,130 B1 * | 8/2019 | Sandberg | G06F 8/65 |
| 10,685,155 B2 | 6/2020 | Wang | |
| 2003/0095141 A1 | 5/2003 | Shah et al. | |
| 2005/0076327 A1 | 4/2005 | Helal et al. | |
| 2005/0278670 A1 | 12/2005 | Brooks et al. | |
| 2006/0214947 A1 | 9/2006 | Boose et al. | |
| 2007/0214171 A1 | 9/2007 | Behnen et al. | |
| 2007/0294074 A1 | 12/2007 | Ciolfi | |
| 2009/0249358 A1 * | 10/2009 | Schuette | G06Q 30/06 719/315 |
| 2009/0326988 A1 * | 12/2009 | Barth | G06Q 10/06313 705/4 |
| 2012/0069131 A1 * | 3/2012 | Abelow | G06Q 10/067 348/14.01 |
| 2014/0122986 A1 | 5/2014 | Spada et al. | |
| 2014/0214495 A1 * | 7/2014 | Kutty | G06Q 10/0637 705/7.36 |
| 2014/0278808 A1 * | 9/2014 | Iyoob | G06Q 30/0206 705/7.35 |
| 2015/0268936 A1 | 9/2015 | Huber et al. | |
| 2016/0048936 A1 | 2/2016 | Perkowski et al. | |
| 2016/0080495 A1 * | 3/2016 | Bilas | G06F 3/0643 709/224 |
| 2016/0274553 A1 | 9/2016 | Strohmenger et al. | |
| 2017/0041296 A1 * | 2/2017 | Ford | H04W 12/06 |
| 2017/0083651 A1 | 3/2017 | Akkaraju et al. | |
| 2017/0109933 A1 | 4/2017 | Voorhees et al. | |
| 2017/0123397 A1 | 5/2017 | Billi et al. | |
| 2018/0011958 A1 | 1/2018 | Irissou et al. | |
| 2018/0011959 A1 | 1/2018 | Irissou et al. | |
| 2018/0139110 A1 | 5/2018 | Johnson et al. | |
| 2018/0324226 A1 * | 11/2018 | Lu | G05B 15/02 |
| 2019/0163355 A1 * | 5/2019 | Govindaraju | G06F 3/0481 |

OTHER PUBLICATIONS

International Searching Authority—International Search Report—International Application No. PCT/US2020/063251 dated Feb. 24, 2021, together with the Written Opinion of the International Searching Authority, 14 pages.

* cited by examiner

METHOD AND SYSTEM FOR DESIGNING DISTRIBUTED DASHBOARDS

PRIORITY

This application is a continuation-in-part of U.S. patent application Ser. No. 16/431,966, filed Jun. 5, 2019, and issued as U.S. Pat. No. 10,685,155 on Jun. 16, 2020 which claims the benefit of U.S. provisional patent application Ser. No. 62/681,397, filed Jun. 6, 2018, and U.S. provisional patent application Ser. No. 62/741,326, filed Oct. 4, 2018. This patent application also claims the benefit of U.S. provisional patent application Ser. No. 62/943,558, filed Dec. 4, 2019, and U.S. provisional patent application Ser. No. 62/945,600, filed Dec. 9, 2019. Each of these applications is hereby incorporated herein, in its entirety, by reference.

TECHNICAL FIELD

The present invention relates to methods of designing dashboards for a distributed heterogeneous computing system.

BACKGROUND ART

The concept of computing and control systems, which have both hardware and software components, is known in the art. A computing and control system includes a set of devices, and implements software on the set of devices to provide coordinated control of equipment and processes, such as manufacturing equipment on factory floors. A computing and control system is considered to be "distributed" when it includes multiple devices, in physically distinct locations, in communication with one another over a network, and some coordination occurs between these devices to provide control of the equipment and processes.

In a distributed computing and control system, dashboards are often included to graphically present relevant data and controls at displays coupled to devices in the system. Such dashboards may include dashboard elements, such as graphs, tables, control elements, etc. As the devices in the system are in physically distinct locations of an organization, to implement dashboards for presentation on the displays, an operator at each location needs to physically go to the corresponding device and install and configure the dashboard software thereon. Such physical installation and configuration, at each location, causes inefficiencies in resource utilization and productivity within the organization.

SUMMARY OF THE EMBODIMENTS

In accordance with one embodiment of the invention, a computer-implemented method characterizes and controls performance of a set of device nodes in a distributed heterogeneous computing and control system. The distributed system has a plurality of device nodes in physically distinct locations, in communication with one another over a network. One or more device nodes in the system require different application programming code due to differences in hardware configuration or software configuration. The method includes configuring, by a design computer, for introduction into each distinct one of the set of device nodes, a corresponding communication facility and a corresponding dashboard instance. After introduction of the corresponding communication facility and dashboard instance into the set of device nodes, the design computer includes a communication facility in communication with the corresponding communication facility of each device node. Any given dashboard instance, either in the design computer or in a given one of the device nodes, is configurable to display data and control elements associated with a selected one of the device nodes.

Optionally, the dashboard instance includes a set of dashboard elements configured to display the data and the control elements. Alternatively or additionally, each dashboard element is a module that represents a graphical component selected from the group consisting of line charts, bar graphs, pie charts, tables, gauges, text fields, dialogue boxes, date selectors, and combinations thereof. Alternatively or additionally, the set of dashboard elements is organized into a set of groups and a set of tabs. Optionally, associating, by the design computer, the dashboard instance with a tab property, and receiving, by the design computer, an assignment of an identifier to the tab property, such that the dashboard instance displays the data and the control elements in a tab labelled with the identifier. Optionally, the dashboard instance is configured to display the data and the control elements on a system dashboard associated with a virtual device executed in the design computer. Optionally, a plurality of dashboard instances is configurable to display data and control elements associated with a same selected one of the device nodes. Optionally, each communication facility includes at least one communication module configured to send data from an input port to a remote destination via a network, or receive data from a remote destination via a network and deliver that data to an output port.

Optionally, the dashboard instance is configured in a computer application designed for implementation in the distributed heterogeneous computing and control system. Alternatively or additionally, the method includes receiving, by the design computer, a selection of a set of the modules and ordering them in a manner to characterize the application as a system schematic of a complete set of the device nodes in the distributed computing and control system. The system schematic being hierarchical and including all elements in all hierarchies, wherein the set of modules includes the dashboard instance. The method further includes parsing, by the design computer, the system schematic to produce a set of sub-schematics of the application, each sub-schematic being a part of the application, wherein each sub-schematic corresponds to one of the set of device nodes and includes a corresponding dashboard instance. The method also includes introducing, by the design computer, each sub-schematic and corresponding communication facility into the corresponding one of the set of device nodes.

Alternatively or additionally, the method includes associating, by the design computer, a dashboard instance with a device property. The method further includes receiving, by the design computer, an assignment of an identified one of the set of device nodes to the device property. The method also includes parsing, by the design computer, the dashboard instance into the sub-schematic corresponding to the identified one of the set of device nodes. The method further includes introducing, by the design computer, the sub-schematic into the identified one of the set of device nodes, such that the dashboard instance displays the data and the control elements associated with the identified one of the set of device nodes.

Alternatively or additionally, the set of device nodes includes a virtual device executed on the design computer, and the method further includes receiving an assignment of (i) the device property to the virtual device and (ii) a tab property to an identifier that causes: parsing, by the design computer, the dashboard instance into the sub-schematic corresponding to the virtual device, and introducing, by the design computer, the sub-schematic into the virtual device, such that the dashboard instance displays the data and the control elements in a system dashboard associated with the virtual device and in a tab labelled with the identifier.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
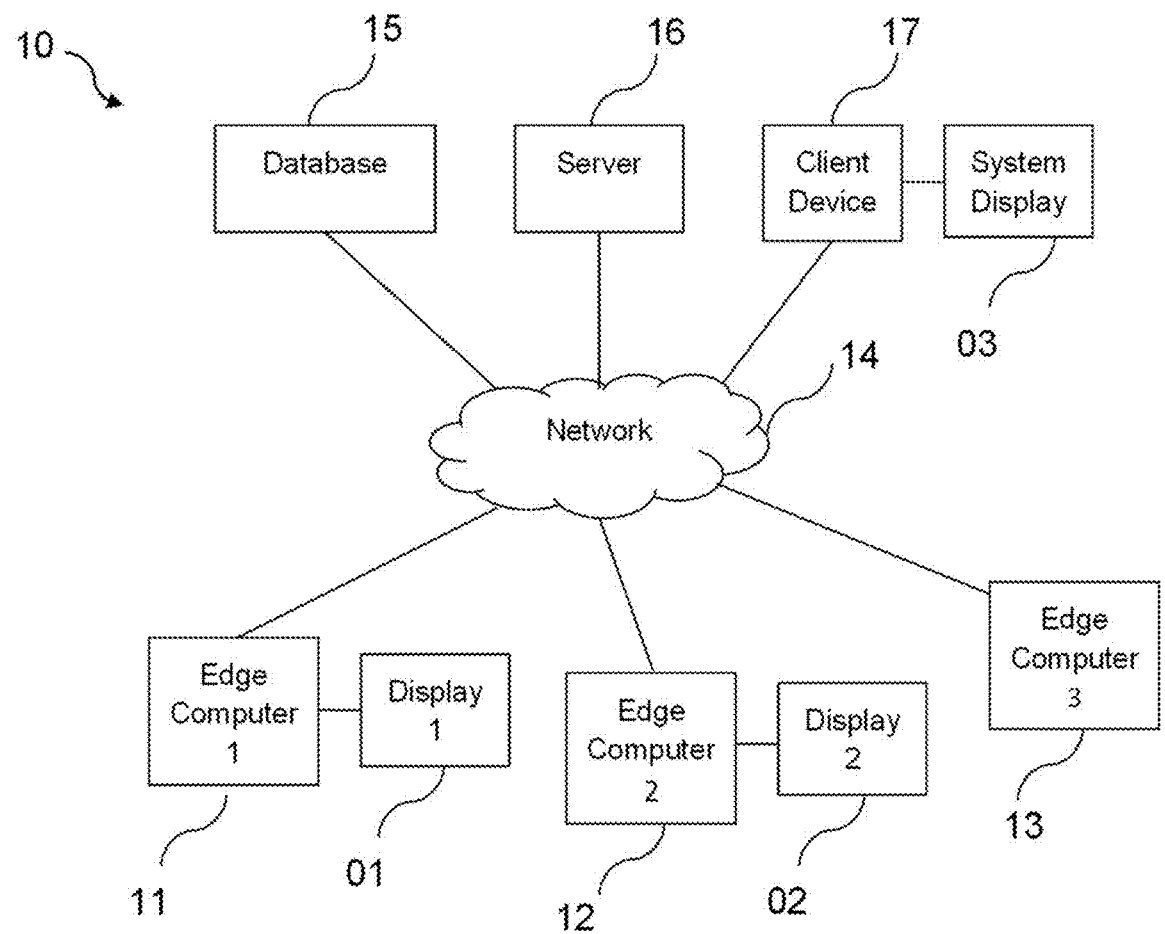
FIG. 1 is an architectural block diagram of a distributed computing and control system having device nodes coupled to displays for presenting dashboards that are implemented in accordance with an embodiment of the present invention.

Definitions. As used in this description and the accompanying claims, the following terms shall have the meanings indicated, unless the context otherwise requires:

A "set" includes at least one member.

A system is "distributed" if it includes a plurality of nodes, in physically distinct locations, in communication with one another over network.

A system is "heterogeneous" if one or more devices in the system require different application programming code due to differences in hardware configuration or software configuration.

An "application" is a task or a set of tasks a device or system needs to accomplish. A "device node" is an instance of an item of hardware, and includes, not only the configuration of the hardware, but also any software environment associated with the hardware.

A "virtual device" is a device that is operationally distinct.

A "communication network", or "network", is a medium used to connect distributed devices together. It can be the internet, or special network protocols such as industrial ethernet, or a combination of multiple network protocols. It can be wired, wireless, or a combination of wired and wireless.

A "server" is a computer used to run software programs. It can be local or in the cloud.

A "database" is an organized collection of data stored and accessed electronically. A "client device" is a device used by a person to interact with a software program. It can be a computer or a mobile device such as a smart phone.

An "edge computer", or "edge device", is a computer or micro-controller device having multiple I/O connection terminals and is used to connect to various sensors, switches, audio/video devices, equipment, or measurement devices and can communicate unidirectionally or bidirectionally with these devices.

A "design software" is a software program that enables a user to design and manage applications for a system. In the present invention, "design software" refers to the software program embodiment to design applications for a distributed heterogeneous computing and control system.

A "user" is a person who uses design software to design or manage applications for a system.

A "schematic" is a virtualized graphical representation of a particular function and is independent of hardware context and software configurations. Virtualizations can be hierarchical.

A "system schematic" is the schematic implemented in the design software that represents the application of the entire distributed heterogeneous computing and control system. A system schematic is hierarchical and includes all elements in all hierarchies.

A "sub-schematic" is a schematic parsed from the system schematic to represent the application of a particular real or virtual device in the distributed heterogeneous computing and control system. Additional modules and other elements can be added into the sub-schematic to complete or enhance functionality.

A "netlist" is a text representation of a schematic. A netlist and its corresponding schematic are functionally equivalent.

A "module", or "design module", is a structure that contains one or more of the following components: property table, symbol, functional schematics, behavioral schematics, and "device-dependent" blocks.

A "dashboard module" is a module that contains functionality for a device node to analyze and present data associate with the device node on a display.

A "dashboard element" is a module that provides a particular graphical function in a dashboard module, such as a line chart, bar graphs, pie charts, tables, gauges, text fields, dialogue boxes, date selectors, etc.

A "module symbol" is a block shape representation of a module. It is used in schematics.

A "module instance" is the instantiation of a module in a schematic. It appears as a module symbol in the schematic, and it instantiates into either a schematic component or a device-dependent block component of the corresponding module. A schematic can contain multiple module instances from the same module.

A "dashboard module instance" is the instantiation of a dashboard module in a schematic.

A "dashboard instance" includes dashboard module instances programmed into a dashboard.

A "pin" of a module represents the input, or output, or bidirectional port of a module. It is where an external signal can be connected. A module can have multiple pins, which are typically drawn as small squares or other shapes in both schematics and symbols.

"Parsing" is the process to extract sub-schematics from the system schematic. Additional modules and other elements can be added to the sub-schematics in the process.

A "communication module", or "comm module", is a module for which the primary function is to send data from its input pin to a remote destination via a network or receive data from a remote destination via a network and deliver that data to its output pin. Note that a comm module can also be implemented as a transmit module and a receive module separately.

A "communication facility" is a component configured in a device node to facilitate communication with other device nodes. The communication facility may comprise one or more communication modules to facilitate such communication.

A "control program" is a software program running in a device that is capable of loading and executing sub-schematics and an init schematic. Different implementations of control programs can exist for different devices or even the same device.

A "compiler" is a software program that converts program code into machine code or lower-level code to be executed on an intended device.

A "control element" is a component of a dashboard in which a user can provide input for controlling performance of a device node or presentation of data associated with a device node.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

FIG. 1 is an architectural block diagram of a distributed computing and control system having device nodes coupled to displays for presenting dashboards that are implemented in accordance with an embodiment of the present invention.

The system 10 includes the device nodes of a centralized server 16, client device 17, and edge computers 11, 12, 13. The centralized server 16 is communicatively coupled, through a communication network 14, to the edge computers 11, 12, 13, the client device 17, and a database 15. The client device 17 may be operated by a user to access software executing on the centralized server 16. Each of the device nodes may be a physical device or a virtual device, and some or all of the device nodes may be heterogeneous (with varying hardware configuration, software configuration, operating system, programming method, development tool, etc.). The communication network 14 may be configured with one or more types of network devices and one or more network protocols.

Some of the device nodes are operatively coupled to a corresponding display, which is used by the device node to present a graphical dashboard. In the embodiment of FIG. 1, edge computer 1 11 is operatively coupled to display 1 01, edge computer 2 12 is operatively coupled to display 2 02, and client device 17 is operatively coupled to system display 03. Display 1 is used to present a dashboard showing operations for edge computer 1, display 2 is used to present a dashboard showing operations for edge computer 2, and the system display is configured to present a system dashboard showing a summary of operations, generated by the server 16, for all the device nodes. Note that not all of the device nodes need to be coupled to a display for presenting a dashboard, for example, edge computer 3 is not coupled to any display. Each of the displays can be a computer monitor that is connected directly to its corresponding device node through a physical cable or wireless connection, or through a network, such as network 14 of FIG. 1. Each of the displays can instead be a display on a mobile device, such as an ipad or iphone, which is integrated directly into a device node.

In some embodiments, the system 10 executes an application that is implemented across the device nodes and requires coordination among the device nodes. The application includes a dashboard for each device node having a coupled display, and the device node presents the dashboard thereon. In an exemplary embodiment, the system may execute an application for monitoring industrial manufacturing that requires coordination between the device nodes. Each edge computer of the system performs some computing and control operation related to the industrial manufacturing, and shows relevant data, charts, statuses, etc. on its coupled dashboard. For example, display 1 may be located on a factory floor, and edge computer 1 presents a dashboard on display 1 that enables operators to view data and control operations with respect to edge computer 1. Display 2 may also located on the factory floor, and edge computer 2 presents a dashboard on display 2 that enables operators to view data and control operations with respect to edge computer 2. The system display may be located elsewhere in the factory or in another separate location, and the server may present to a supervisor, via client device 17, a summary of operations from all the edge computers (edge computer 1, 2, 3) on the system display.

In embodiments of the present invention, a user designs an application to be implemented across the device nodes by defining a system schematic of the application functions, including the dashboards. The system schematic is parsed into sub-schematics for each of the device nodes, with each dashboard parsed into the sub-schematic of its corresponding device node. In embodiments, properties associated with a dashboard may be set so that the dashboard is parsed into the sub-schematic of a different device node, such as the dashboard of an edge computer parsed into the sub-schematic of the server. In some embodiments, each sub-schematic is loaded and executed in its corresponding device node by a control program implemented for that corresponding device node. In other embodiments, each sub-schematic is compiled into binary code that is loaded and executed in the corresponding device node.

Figure 2:
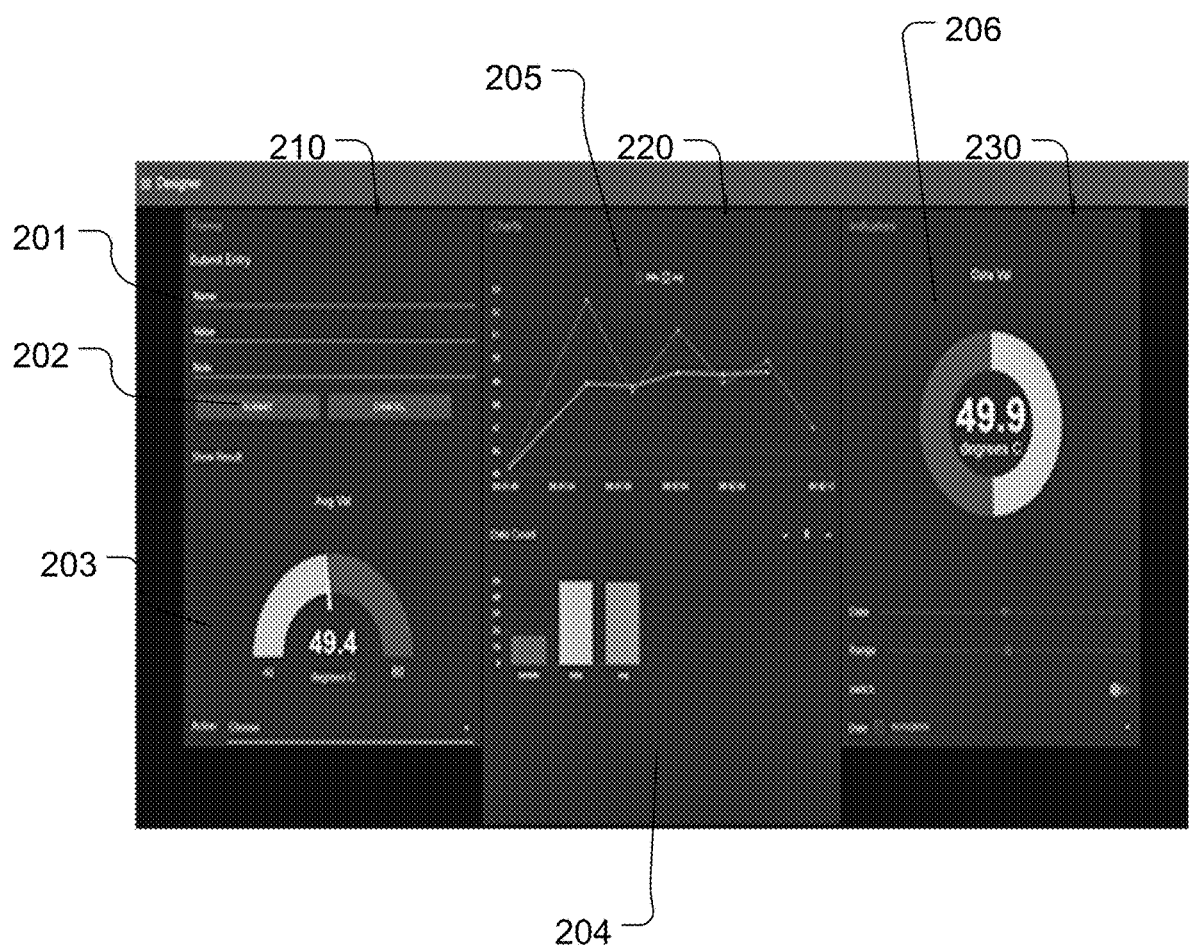
FIG. 2 is a representation of a dashboard which is implemented, in accordance with an embodiment of the present invention, on a device node of FIG. 1 for presentation in a display coupled to the device node.

FIG. 2 is a representation of a dashboard which is implemented, in accordance with an embodiment of the present invention, on a device node of FIG. 1 for presentation in a display coupled to the device node. The dashboard of FIG. 2 includes various dashboard elements 201, 202, 203, 204, 205, 206, which graphically present data and receive input controls related to the operations of the device node.

Figure 3:
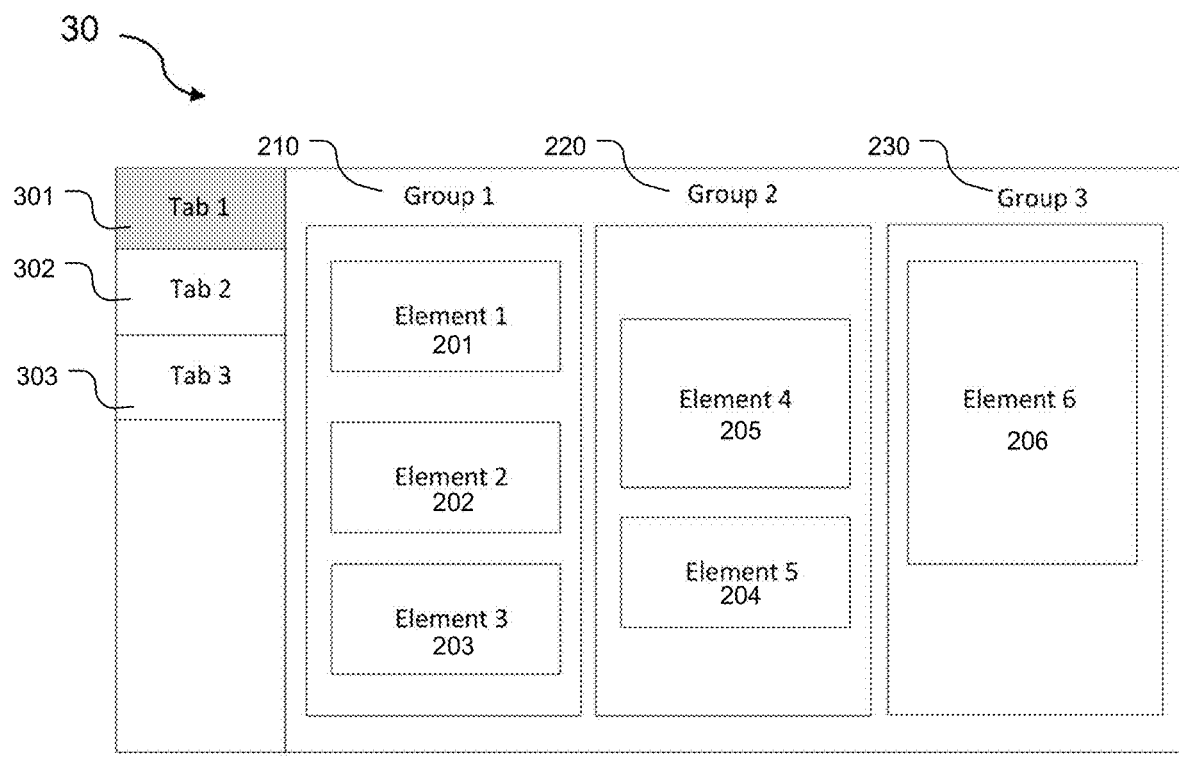
FIG. 3 is a representation of the dashboard of FIG. 2 showing organization of dashboard elements into groups and tabs, in accordance with an embodiment of the present invention.

FIG. 3 is a representation of the dashboard 30 of FIG. 2 showing organization of dashboard elements into groups and tabs, in accordance with an embodiment of the present invention. As shown in FIG. 3, a dashboard 30 can be formed of dashboard elements grouped in an organizable order. The dashboard of FIG. 3 has multiple tabs 301, 302, 303, each organized into one or more groups having one or more dashboard elements. In FIG. 3, the dashboard of FIG. 2 is organized under Tab 1 and into three groups (Group 1 210, Group 2 220 and Group 3 230). Group 1 210 is entitled "Forms" and includes three dashboard elements 201, 202, and 203. Group 2 is entitled "Charts" and includes two dashboard elements 204, 205. Group 3 is entitled "Indicators" and includes one dashboard element 206.

Prior software could only build a dashboard for one device, which was presented on a display coupled to that device. Using design software in embodiments of the present invention, a dashboard can be built for multiple distributed device nodes. For example, the data associated with the multiple device nodes can be organized into the different tabs (e.g., Tab 1, Tab 2, Tab 3 of FIG. 3) and/or groups (e.g., Group 1, Group 2, Group 3 of FIG. 3) and presented on one dashboard, or the data associated with the multiple device nodes can be presented on multiple corresponding dashboards. Such dashboards can be implemented for presentation on a display coupled to any of the distributed device nodes.

Figure 4:
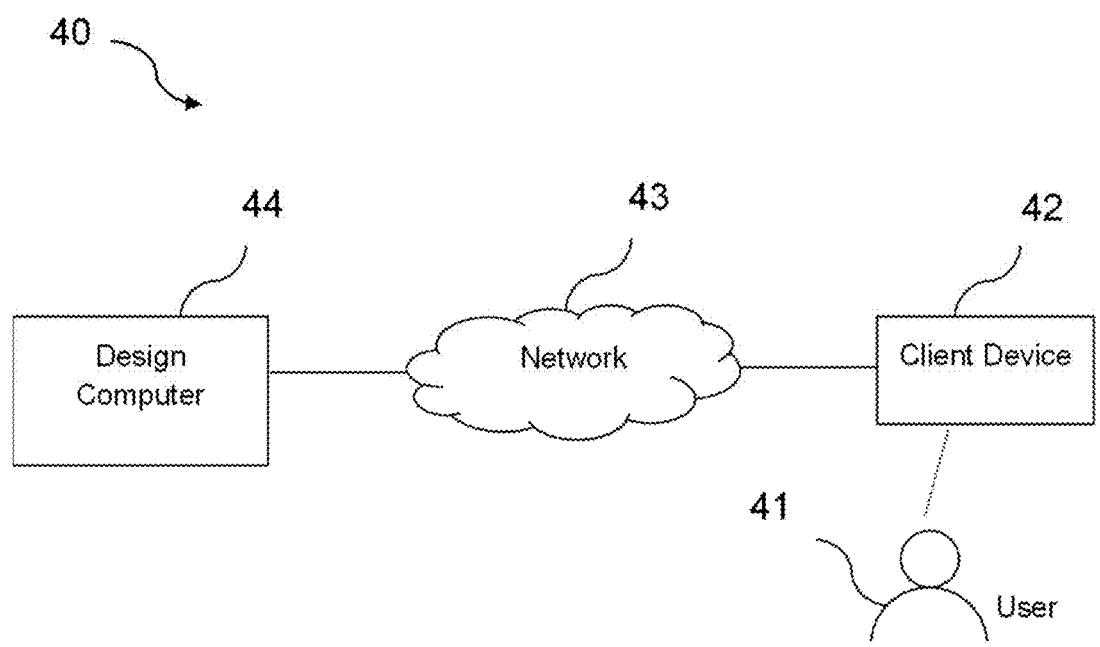
FIG. 4 is a block diagram of a system in accordance with an embodiment of the present invention, including a design computer that executes a design software program to establish a graphically accessible interactive computer environment, accessible by a client device operated by a user, for creating an application for the system of FIG. 1.

FIG. 4 is a block diagram of a system 40 in accordance with an embodiment of the present invention, including a design computer 44 that executes a design software program to establish a graphically accessible interactive computer environment, accessible by a client device 42 operated by a user, for creating an application for the system of FIG. 1. The design software enables the automated design of the application. In embodiments, the design computer 44 is server 16 of FIG. 1, and the client device 42 is client device 17 of FIG. 1. The system 40 of FIG. 4 is a client-server combination in a network environment, which includes the design computer 44 communicatively coupled to a client device 42 through a network 43. The client device 42 is operated by a user 41. The design software is associated with a graphical user interface, which the design computer 44 displays to the user 41 via the client device 42. The client device 42 may be a computer that executes a web browser or a local software program, a mobile device that executes an app, and such. In other embodiments, the system may be a stand-alone computer. The system of FIG. 4 is further described in U.S. patent application Ser. No. 16/431,966, filed on Jun. 5, 2019, which is herein incorporated, in its entirety, by reference.

Figure 5:
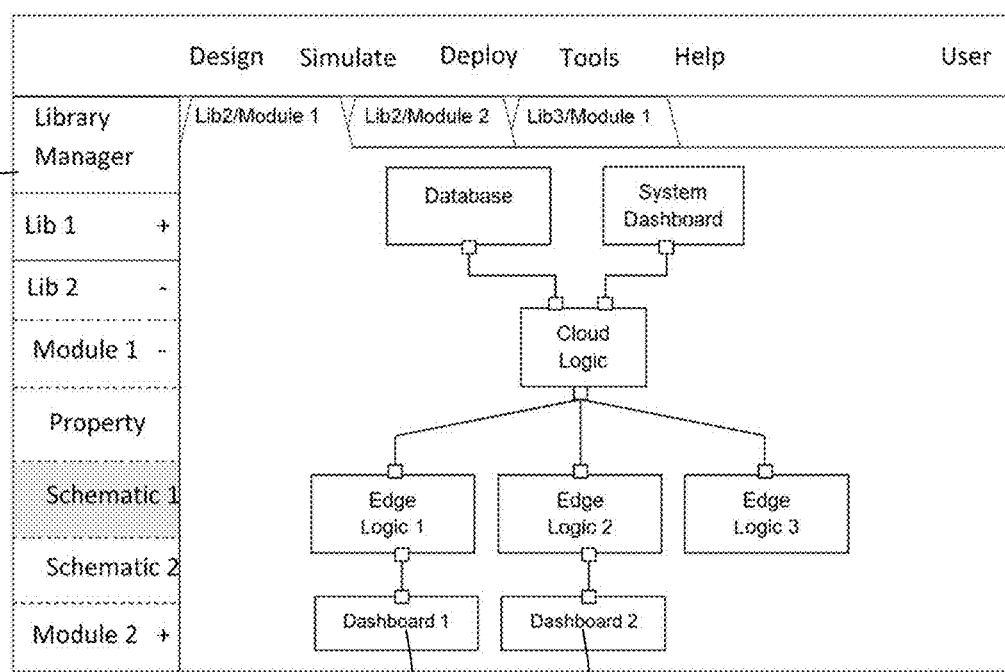
FIG. 5 is a representation of a screen displayed by the design software of FIG. 4, in accordance with an embodiment of the present invention, showing the graphical user environment for designing a system schematic for an application implemented in the distributed computing and control system of FIG. 1, wherein dashboard modules are placed in the system schematic to characterize dashboards in the system.

FIG. 5 is a representation of a screen 50 displayed by the design software of FIG. 4, in accordance with an embodiment of the present invention, showing the graphical user environment for designing a system schematic for an application implemented in the distributed computing and control system of FIG. 1, wherein dashboard modules are placed in the system schematic 52 to characterize dashboards in the system.

Using the graphical user environment of FIG. 5, a user designs an application for a distributed computing and control system by configuring a system schematic to represent the application functions. As shown in FIG. 5, the graphical user environment includes a library manager 54 organized into libraries of modules (e.g., Module 1, Module 2, etc). Each module provides logic for a component of a distributed computing and control system of FIG. 1, and has corresponding properties (Property) and schematics (Schematic 1, Schematic 2, etc.). To design an application for the distributed computing and control system of FIG. 1, the user creates instances of a set of the modules (e.g., Edge Logic 1, Edge Logic 2, Cloud Logic, etc.) and hierarchically orders the module instances into the system schematic. Each module may be comprised of other modules that define the logic for the represented component of the distributed computing and control system. The design software and graphical user environment is further described in U.S. patent application Ser. No. 16/431,966, filed on Jun. 5, 2019, which is herein incorporated, in its entirety, by reference.

As shown in FIG. 5, a dashboard module is included in the libraries of the graphical user environment, or a primitive module may be used to build a dashboard module. The dashboard module includes logic that creates a visual dashboard, such as shown in FIG. 2, on a computer display coupled to a device node. Multiples instances of the dashboard module may be included in the same application design, which can each applied to the same or different device nodes of the distributed computing and control system of FIG. 1.

In FIG. 5, the dashboard module (Dashboard 1) 57, also referred to as a dashboard module instance, is created for the dashboard executed by Edge Computer 1, and ordered in associated with the module (Edge Logic 1) for Edge Computer 1 in the system schematic. Edge Logic 1 collects data related to Edge Computer 1, and generates data analytics results to be shown via the logic of Dashboard 1. Similarly, another dashboard module (Dashboard 2) 58 is created for the dashboard executed by Edge Computer 2, and ordered in associated with the module (Edge Logic 2) for Edge Computer 2 in the system schematic. Edge Logic 2 collects data related to Edge Computer 2, and generates data analytics results to be shown via the logic of Dashboard 2. Further, another instance of the dashboard module (System Dashboard) is created for the system dashboard executed by the Server, and ordered in association with the module instance for the cloud functions (Cloud Logic) of the server in the system schematic. Cloud Logic collects data related to all the edge computing devices, and generates data analytics results to be shown via the logic of the system dashboard.

In some embodiments, each dashboard module, also referred to as a dashboard instance, contains a set of dashboard elements, which may include modules representing one or more of bar graphs, pie charts, tables, gauges, text fields, dialogue boxes, date selectors, etc., that define the function of the represented dashboard. Individual dashboard elements can exist anywhere in the system schematic or in any hierarchy (and are not limited to being contained in a dashboard instance).

Figure 6:
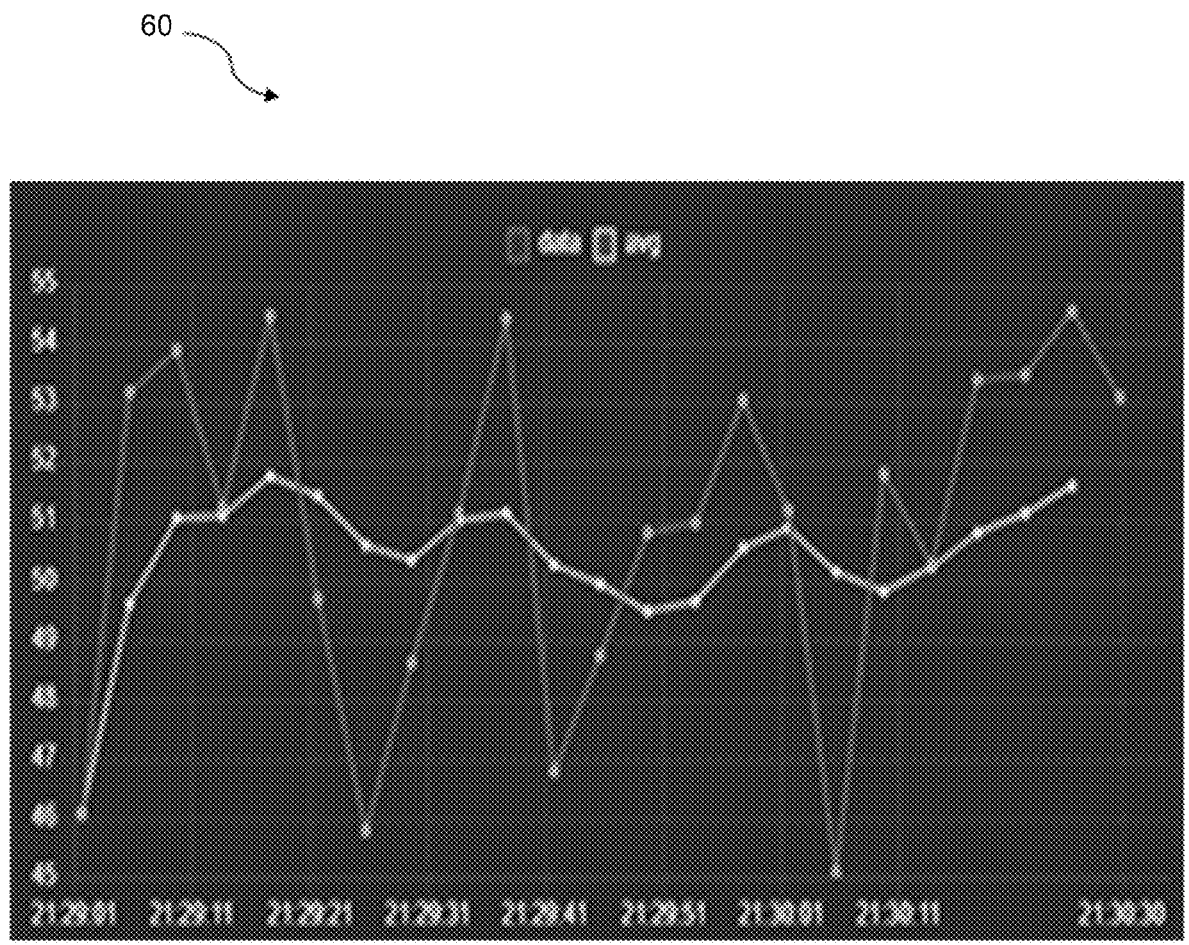
FIG. 6 is a representation of a graphical dashboard element (line chart) presented in a dashboard, such as the dashboard of FIG. 2, in accordance with an embodiment of the present invention.

FIG. 6 is a representation of a graphical dashboard element (line chart) 60 presented in a dashboard, such as the dashboard of FIG. 2, in accordance with an embodiment of the present invention.

Figure 7:
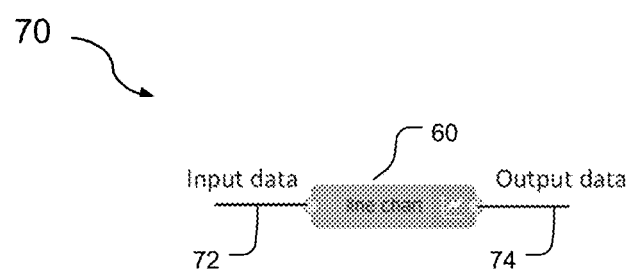
FIG. 7 is a representation of a dashboard element module used to represent the graphical element (line chart) of FIG. 6 in a dashboard module of FIG. 5, in accordance with an embodiment of the present invention.

FIG. 7 is a representation of a graphical dashboard element module 70 used to represent the graphical element (line chart) 60 of FIG. 6 in a dashboard module of FIG. 5, in accordance with an embodiment of the present invention. FIG. 7 shows the graphical symbol used to represent the dashboard element, also referred to as a dashboard element module, in the graphical user environment of FIG. 5. The graphical symbol has one or more input pins 72 for data that is input to the dashboard element for printing, plotting, etc. The graphical symbol also includes zero or more output pins 74 for any data output from the dashboard element. Other configuration parameters can be selectable for the graphical element. The dashboard element may be placed within another module, such as a dashboard module (e.g., the Dashboard 1 module of FIG. 5) so as to form a dashboard instance, to define a graphical function of the dashboard represented by the dashboard module. The dashboard element may be organized in the dashboard module in a group and/or tab as shown in FIG. 3. When the dashboard module is transmitted and executed at the corresponding device node, the dashboard element plots the input data, in the display coupled to the device node.

The embodiment of the dashboard element in FIG. 7 represents a line chart. In other embodiments, a dashboard element can represent a bar graph, a pie chart, table, a gauge, a text field, a dialogue box, a date selector, or any other graphical feature of a dashboard without limitation.

Figure 8:
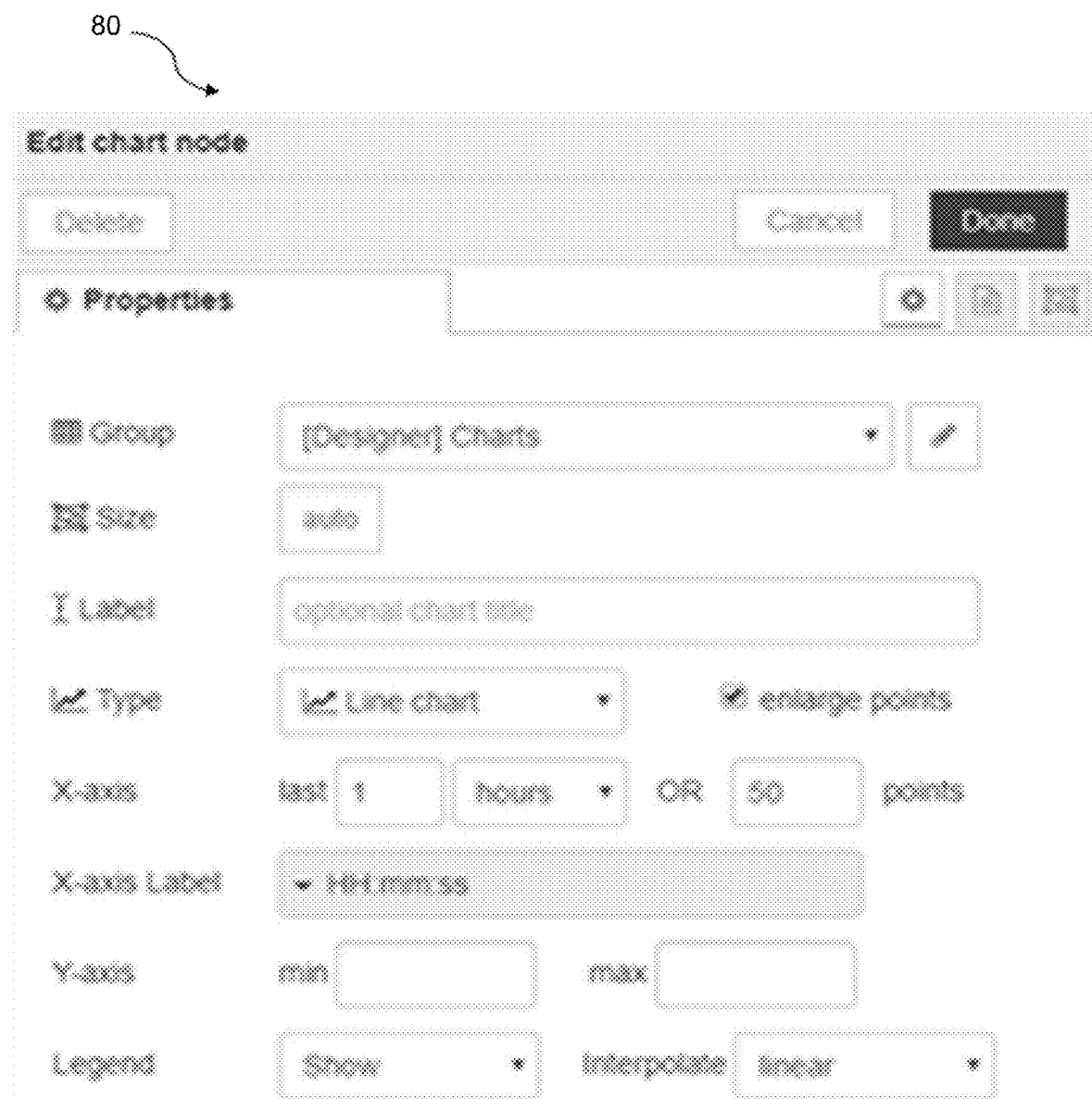
FIG. 8 is a representation of a screen used to define properties associated with the dashboard element module of FIG. 7, in accordance with an embodiment of the present invention.

FIG. 8 is a representation of a screen 80 used to define properties associated with the dashboard element module of FIG. 7, in accordance with an embodiment of the present invention. As shown in FIG. 8, the device properties screen 80 includes device properties that define the configuration (settings) of the associated dashboard element, such as type (line chart), label size, characteristics of the x-axis and y-axis of the dashboard element, and any legend. The properties also include the group where the dashboard element is placed in the organization of a dashboard, such as shown in FIG. 3. The dashboard element of FIG. 8 is placed in the Charts group.

In embodiments, each dashboard element has a device property, in addition to the other properties shown in FIG. 8. The device property includes the device node to which the dashboard element is parsed into the corresponding sub-schematic, and the sub-schematic is communicated to that device node for presentation on a coupled display. The device property is typically set to the unique device identifier of the device node coupled to the display that presents the dashboard containing the dashboard element. When the dashboard element is placed inside another module, such as a dashboard module (e.g., Dashboard 1 of FIG. 5), the dashboard element inherits the device property of the other module, such that both are parsed into the same sub-schematic and communicated to the same device node. In such a configuration, a device property setting is not required for the dashboard element, but still may be provided to change such inheritance.

Figure 9:
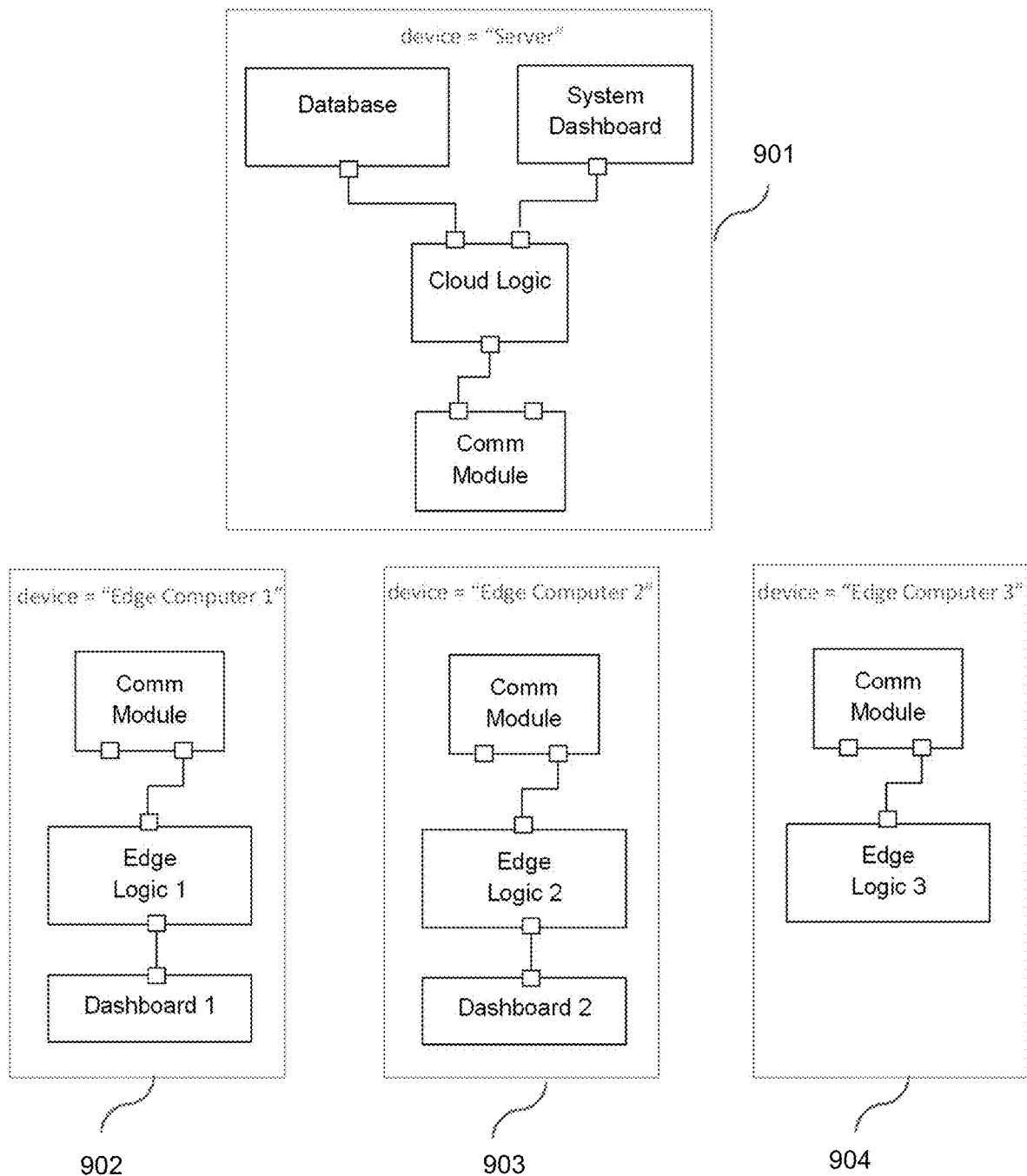
FIG. 9 is a block diagram showing sub-schematics, each sub-schematic corresponding to one of the device nodes in the computing and control system of FIG. 1, parsed from the system schematic of FIG. 5, in accordance with an embodiment of the present invention, wherein the dashboard modules are included in the sub-schematics of their corresponding device nodes.

FIG. 9 is a block diagram showing sub-schematics, each sub-schematic corresponding to one of the device nodes in the computing and control system of FIG. 1, parsed from the system schematic of FIG. 5, in accordance with an embodiment of the present invention, wherein the dashboard modules are included in the sub-schematics of their corresponding device nodes.

Each module instance in the system schematic of FIG. 5 includes a device property specifying a particular device node in the computing and control system of FIG. 1. The design software, executing on the design computer, parses each module of the system schematic into a sub-schematic corresponding to the device node set in that module's device property. For example, the Database, System Dashboard (and any dashboard elements contained therein), and Cloud Logic each has its device property set to the unique identifier assigned to the server, so they are parsed into the "Server" sub-schematic for communication to and execution at the server device node. For another example, Edge Logic 1 and Dashboard 1 (and any dashboard element contained therein) each has its device property set to the unique identifier assigned to Edge Computer 1, so they are parsed into the "Edge Computer 1" sub-schematic for communication to and execution at the Edge Computer 1 device node. To provide communication between the modules of different device nodes, a communication facility (in the embodiment of FIG. 9 the communication facility includes Comm Modules) is added to each sub-schematic along with any modules and properties required to execute the sub-schematic at the corresponding device node. Parsing of system schematics, including the addition of other modules, such as Comm Modules, and properties during the parsing, is further described in U.S. patent application Ser. No. 16/431,966, filed on Jun. 5, 2019, which is herein incorporated, in its entirety, by reference.

In FIG. 9, each dashboard module instance (and dashboard elements contained therein) is parsed into sub-schematics 901, 902, 903, 904 corresponding to physical device nodes and communicated to those device nodes for execution. As such, the user cannot see the visual result of the dashboard module by accessing the design computer via a client device. The user can only see the dashboard module by going to the physical display coupled to the device node where the dashboard module was communicated and executed. This is highly inconvenient during the design phase of an application, because the user typically works on the design software in the user's office, via a client device connection to the design computer, and the device nodes (and coupled displays) are deployed in other locations not accessible via the client device.

Figure 10:
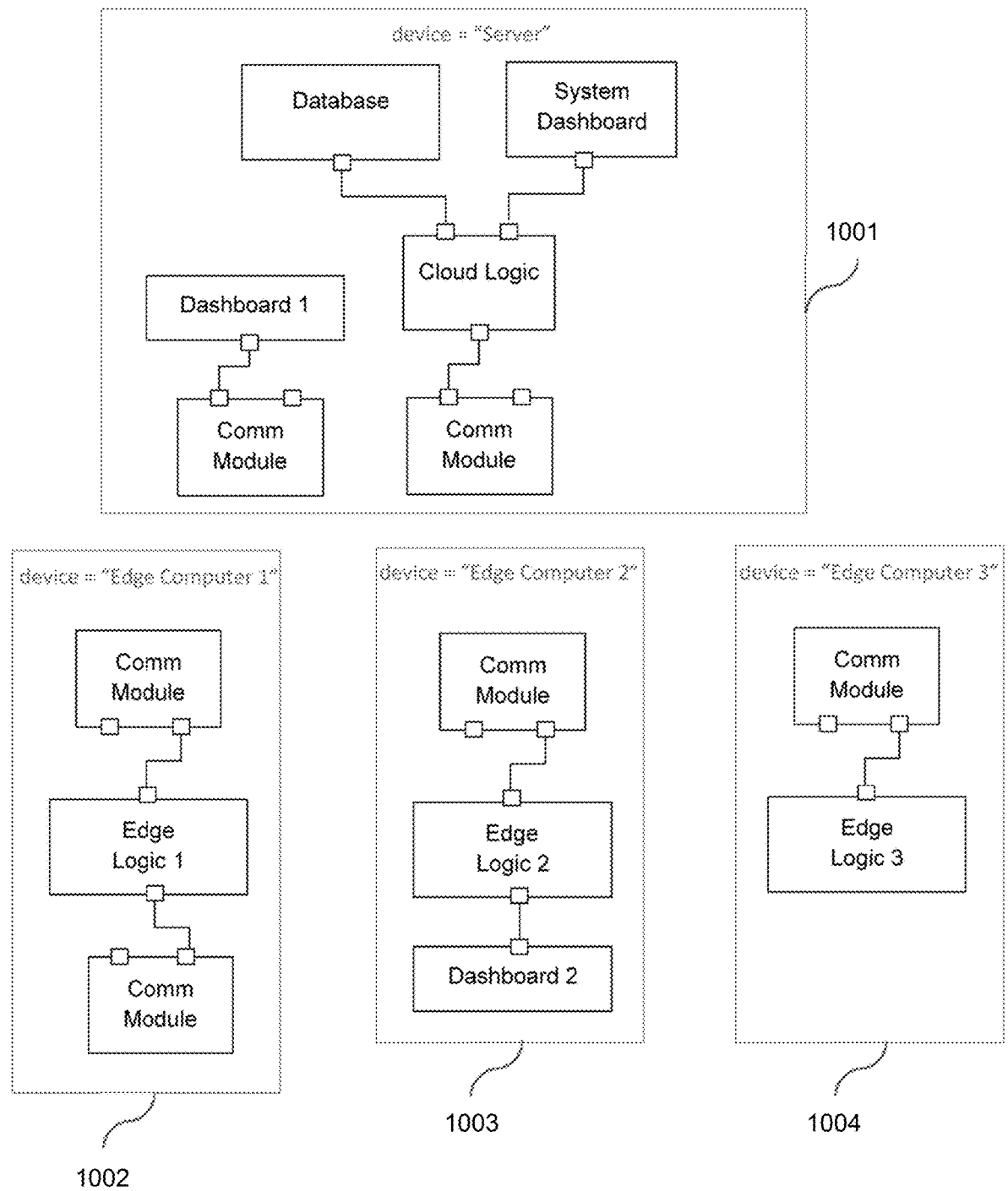
FIG. 10 is a block diagram showing sub-schematics, similar to that of FIG. 9, with each sub-schematic corresponding to one of the device nodes in the computing and control system of FIG. 1, in accordance with an embodiment of the present invention, wherein one of the sub-schematics corresponds to a server but includes a dashboard module of an edge device.

FIG. 10 is a block diagram showing sub-schematics 1001, 1002, 1003, 1004, similar to that of FIG. 9, with each sub-schematic corresponding to one of the device nodes in the computing and control system of FIG. 1, in accordance with an embodiment of the present invention, wherein one of the sub-schematics 1001 corresponds to a server but includes a dashboard module of an edge device.

The embodiment of FIG. 10 enable the display of the dashboard module instances for edge computers in the system dashboard of the design computer (server), so they can be accessed by a user via a client device. The system dashboard module (and dashboard elements contained therein) typically has its device property set to the virtual device (e.g., "designer") executed inside the design software on the design computer, so that the system dashboard is parsed into the sub-schematic for the virtual device. The system dashboard module also has its tab property set to "designer" so as to be displayed in a "Designer" tab in the graphical user environment of FIG. 5. To similarly display the dashboard (e.g., Dashboard 1) of an edge computer in the system dashboard, so as to be accessible by a user for testing during the design phase, the device property of the device dashboard module can also be set to the to the virtual device (e.g., "designer"), so that the device dashboard module is parsed into the sub-schematic for the virtual device. To display the device dashboard in a separate tab from the system dashboard, a different tab name (e.g., "device") can be provided for the device dashboard module. This way, the dashboard elements for the device dashboard are shown in a separate tab from the system dashboard, so as to prevent confusion with the system dashboard elements. In other embodiments, the device dashboard module may also be set to the tab of "designer" so as to design the dashboard elements of each dashboard together under the same tab. In these embodiments, the device dashboard and system dashboard may be configured, via the properties, to be organized into different groups so as to prevent confusion.

In FIG. 10, the Dashboard 1 module (and any dashboard element contained therein) is changed, in the properties for the Dashboard 1 module, from the unique device identifier of Edge Computer 1 to the device identifier for the virtual device. Further, the tab property for the Dashboard 1 module is set to "Device." As such, the Dashboard 1 module is parsed into the server sub-schematic 1001, which is executed on the virtual device of the server. In addition, the communication facility (in the embodiment of FIG. 10 the communication facility includes a Comm Module) associated with the Dashboard 1 module is moved to the server sub-schematic 1001. In other embodiments, the device property of the dashboard module may be set to another device in the system (instead of the server), and is parsed into this other device's sub-schematic, which is executed on the other device for presentation on its coupled display.

After parsing, the dashboard elements of the Dashboard 1 are placed in the system dashboard under the "Device" tab. The dashboard elements of the system dashboard continue to be presented under the separate "Designer" tab. Thus, the user can view, and make design adjustments, to either the system dashboard under the "Design" tab or Dashboard 1 under the "Device" tab.

Once the user completes the design phase, the user can change the device property of the Dashboard 1 module back to the unique identifier for Edge Computer 1. The dashboard elements for Dashboard 1 are then parsed into the sub-schematic 902 for Edge Computer 1, as shown in FIG. 9, which is communicated to Edge Computer 1 for execution on its coupled display. The "Device" tab is removed from the System Dashboard and instead placed on Dashboard 1 presented on the display coupled to Edge Computer 1.

Figure 11:
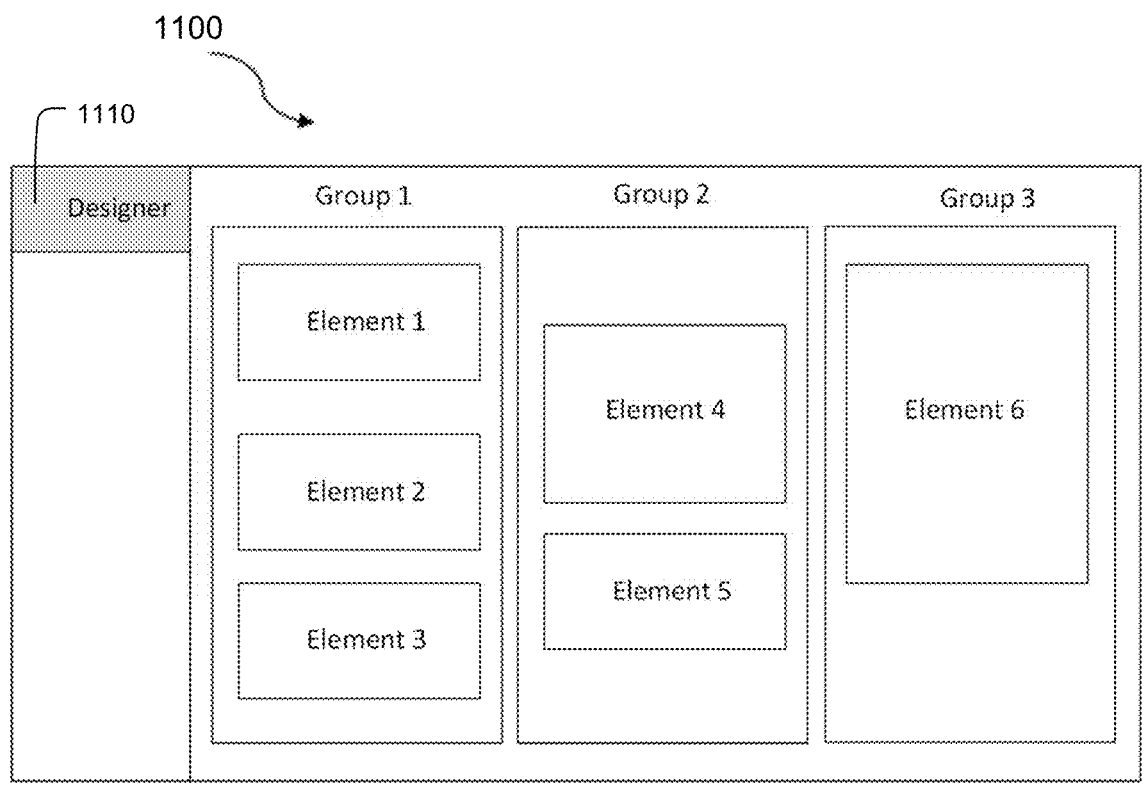
FIG. 11 is a representation of a screen displaying a system dashboard organized in a designer tab, in accordance with an embodiment of the present invention, wherein the system dashboard is implemented on a virtual machine executed in the design computer of FIG. 4.

FIG. 11 is a representation of a screen 1100 displaying a system dashboard organized in a designer tab 1110, in accordance with an embodiment of the present invention, wherein the system dashboard is implemented on a virtual machine executed in the design computer of FIG. 4. In the embodiment of FIG. 11, the server is the design computer of FIG. 4. In the embodiment of FIG. 11, the system dashboard is the only dashboard executed by the virtual device of the server, as indicated by only the designer tab being displayed on the system dashboard.

Figure 12:
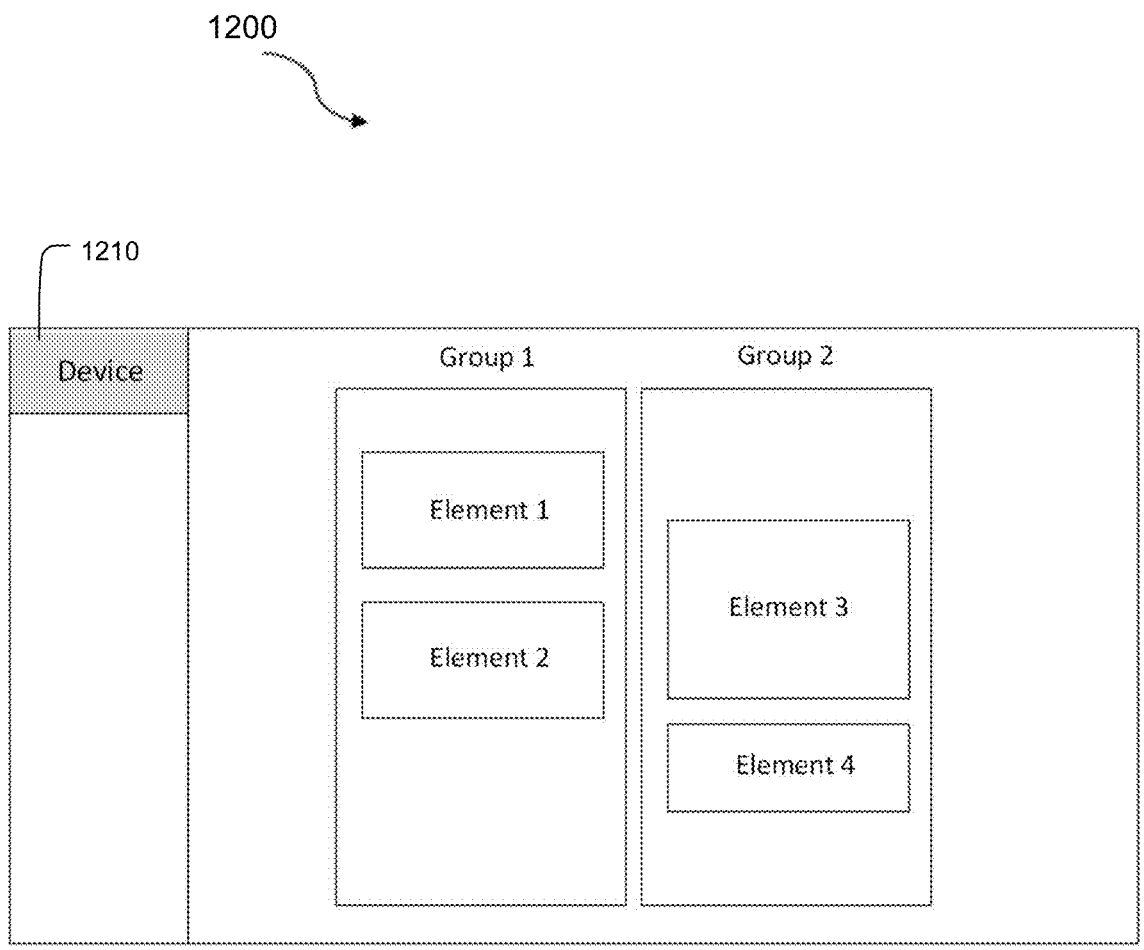
FIG. 12 is a representation of a screen displaying a device dashboard organized in a device tab, in accordance with an embodiment of the present invention, wherein the device dashboard is implemented on a corresponding device node in the computing and control system of FIG. 1.

FIG. 12 is a representation of a screen 1200 displaying a device dashboard organized in a device tab 1210, in accordance with an embodiment of the present invention, wherein the device dashboard is implemented on a corresponding device node in the computing and control system of FIG. 1. In the embodiment of FIG. 12, the server is the design computer of FIG. 4. When the Dashboard 1 module is parsed in the Edge Computer 1 sub-schematic, which is communicated to Edge Computer 1 for execution, Edge Computer 1 presents Dashboard 1, under the "Device" tab on its coupled display. In other embodiments, Dashboard 1 may be organized to have additional tabs.

Figure 13:
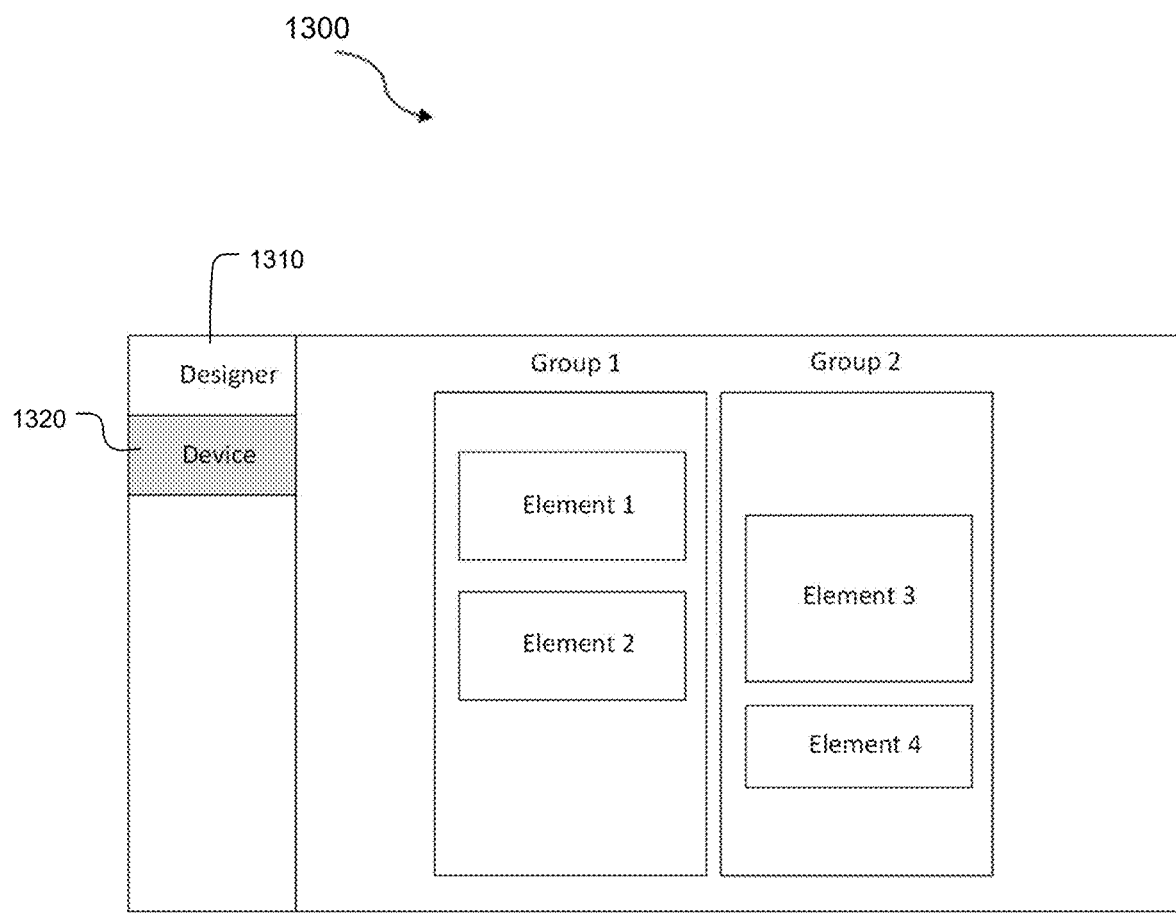
FIG. 13 is a representation of a screen displaying a system dashboard organized in a designer tab and a device dashboard organized in a device tab, in accordance with an embodiment of the present invention, wherein the system and device dashboards are each implemented on a virtual machine executing in the computer node of FIG. 4.
Figure 2:
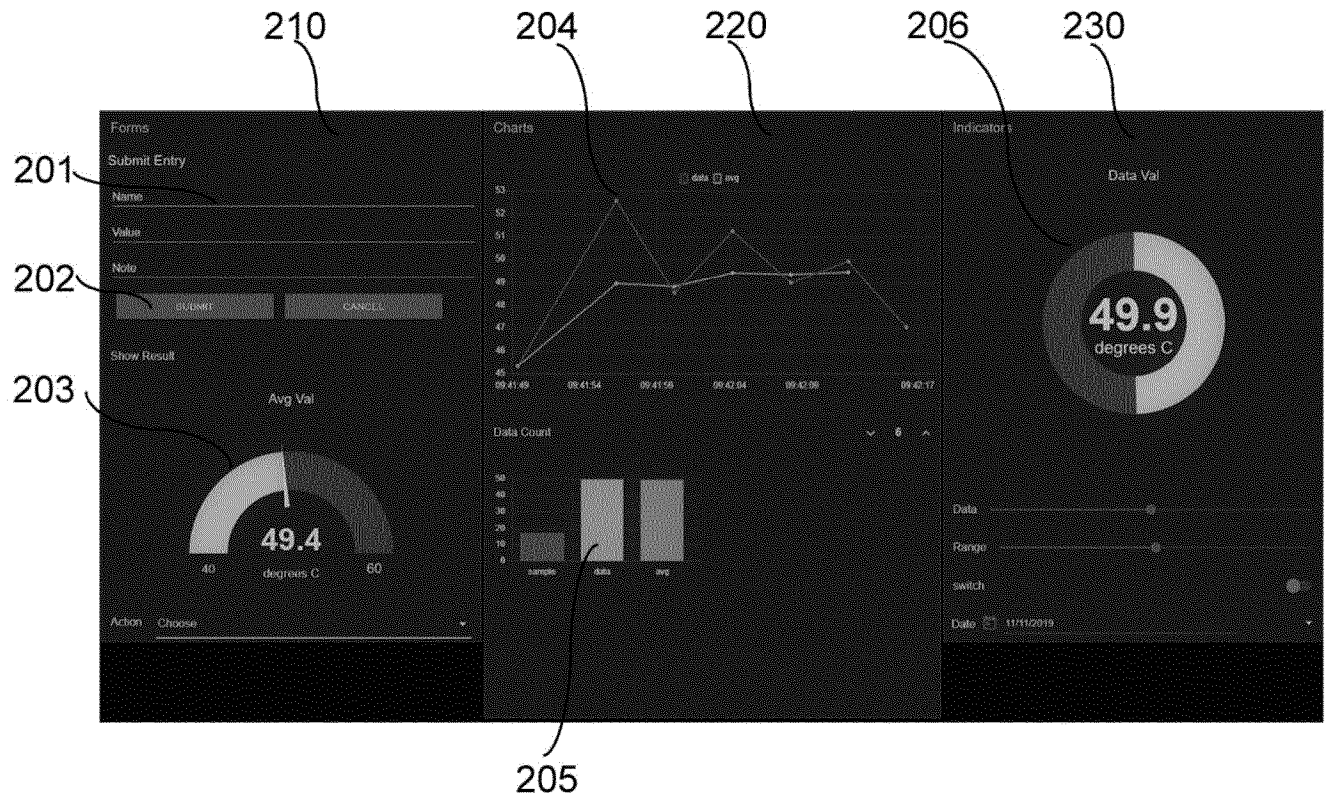
Figure 6:
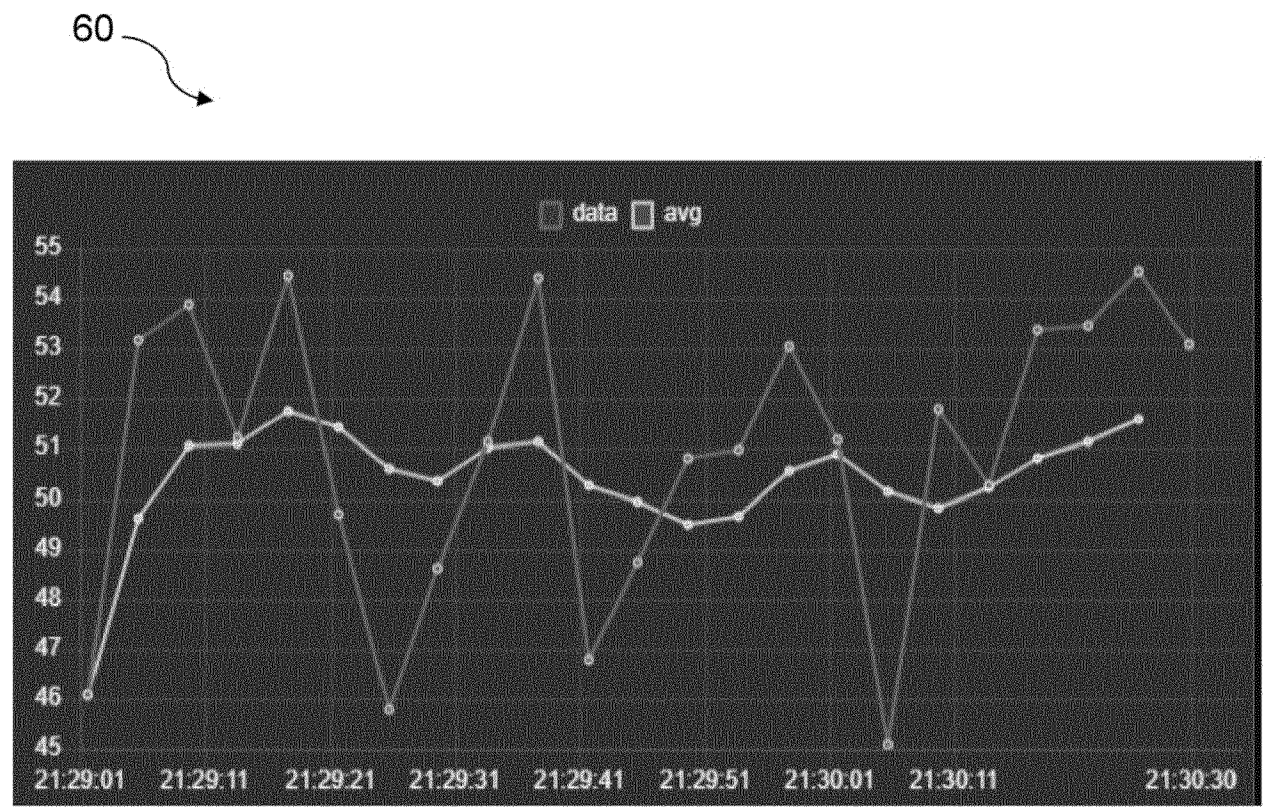
Figure 7:
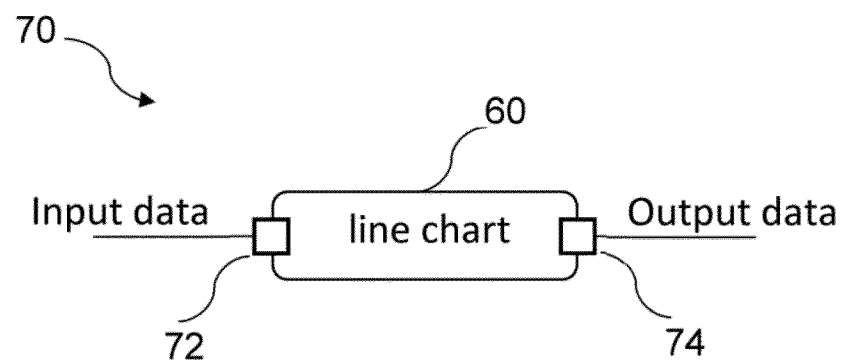
Figure 8:
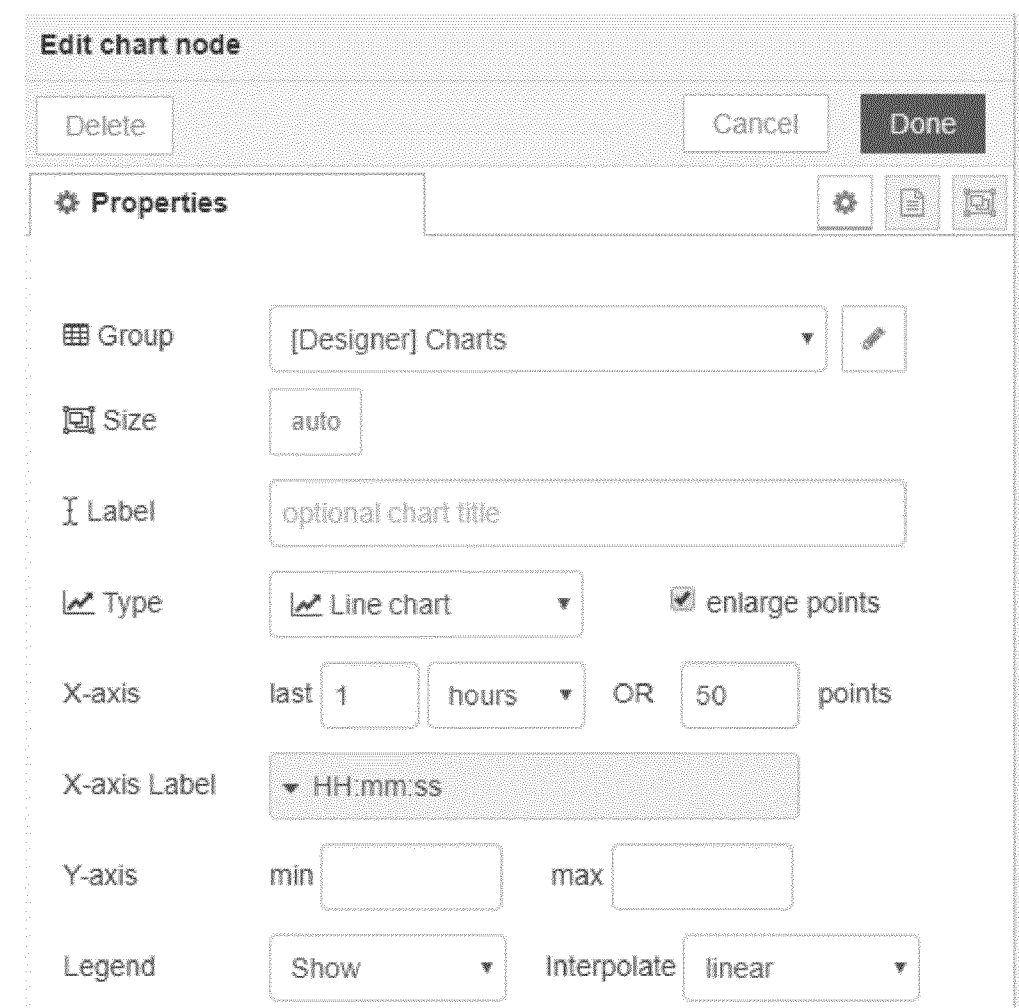
Figure 9:
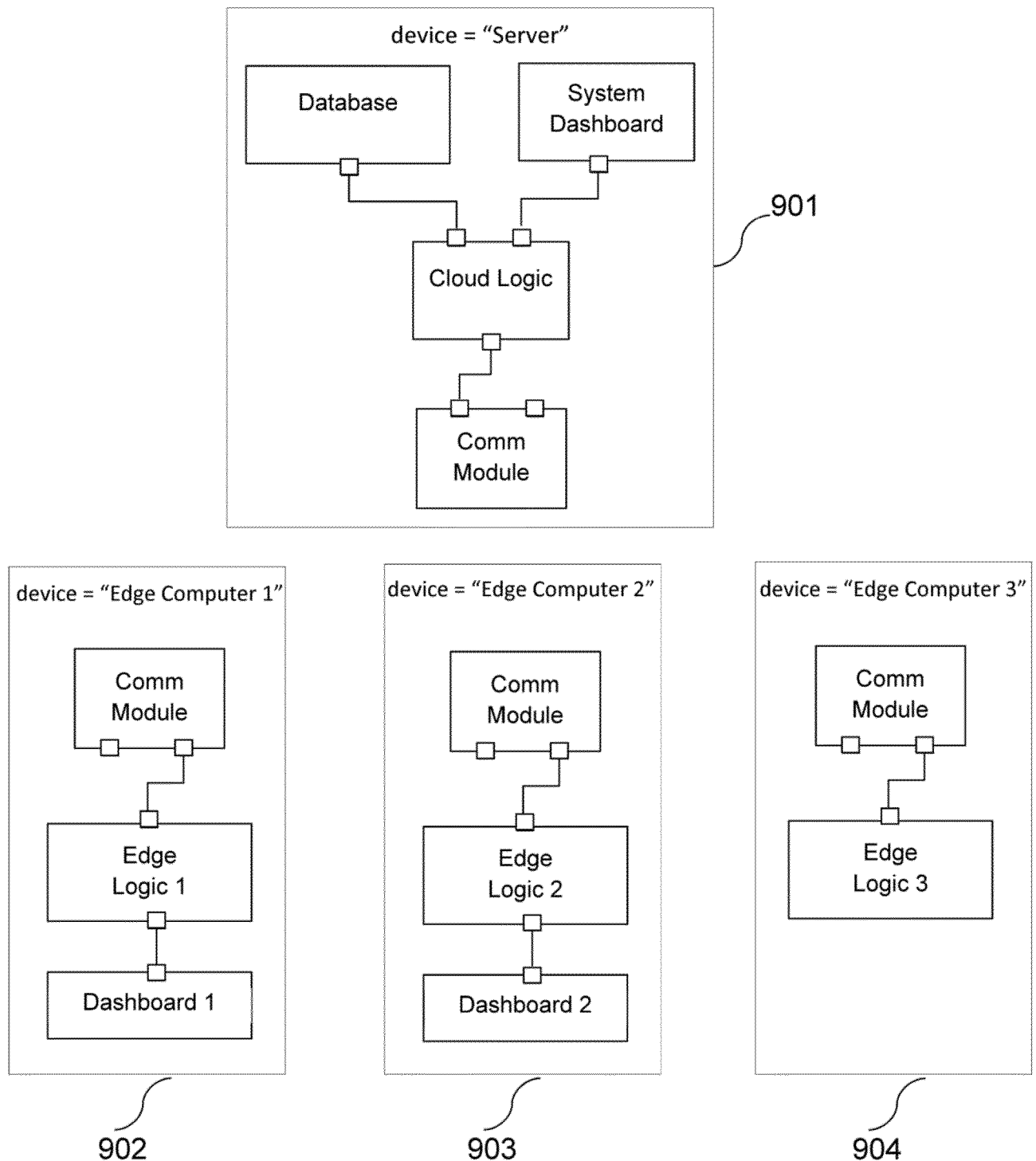
Figure 10:
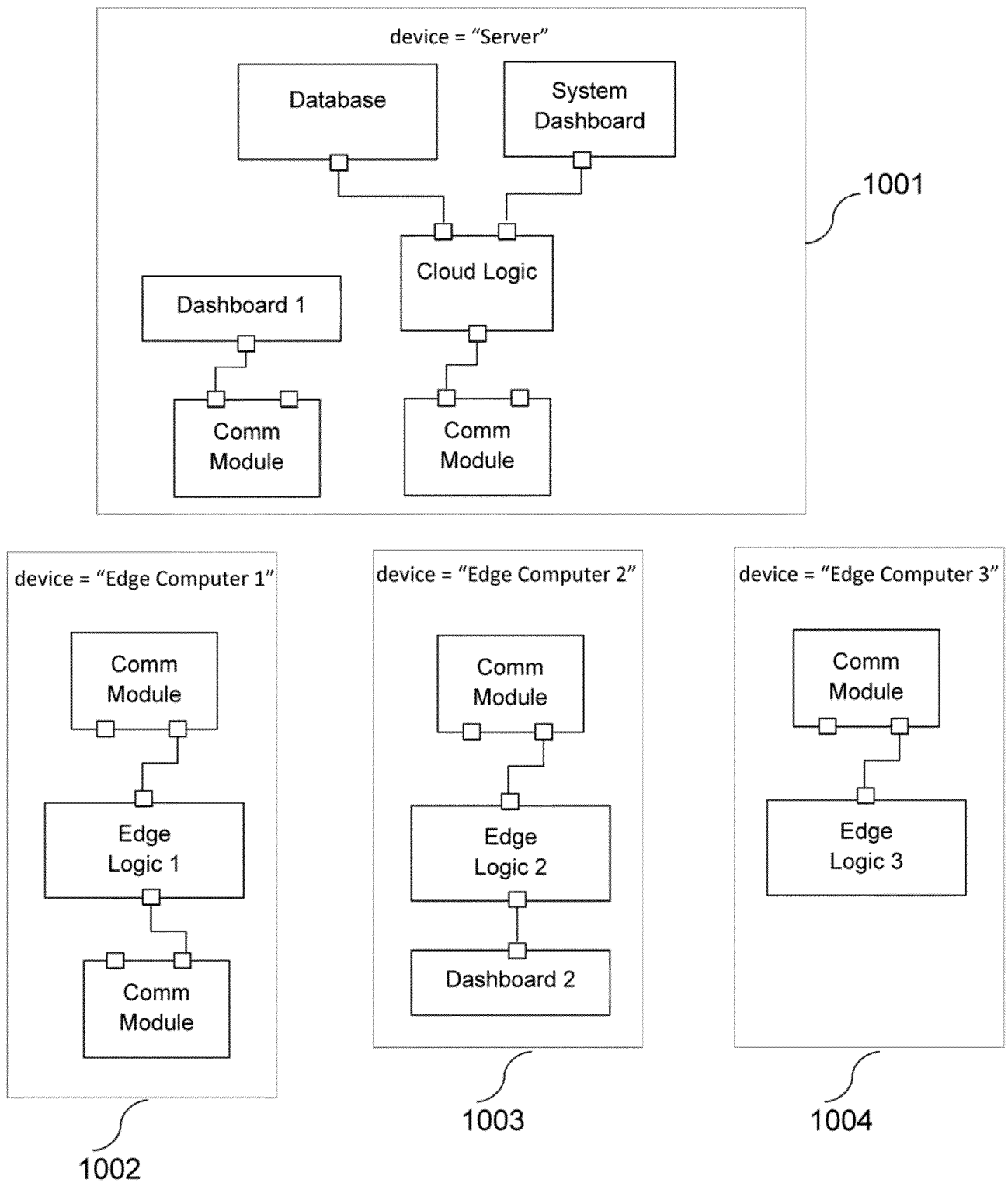

FIG. 13 is a representation of a screen 1300 displaying (a) a system dashboard organized in a designer tab 1310 and (b) a device dashboard organized in a device tab 1320, in accordance with an embodiment of the present invention, wherein the system and device dashboards are each implemented on a virtual machine executing in the computer node of FIG. 4. In the embodiment of FIG. 13, the server of FIG. 1 is the design computer of FIG. 4. FIG. 13 shows the system dashboard when Dashboard 1's device property is set to parse Dashboard 1 into the server device node. Because both dashboards are executed in the server device node, they both are presented on the system display associated with the server device node (which is generally a client device node connected to the server device node through the network, but in some embodiment the server device node is connected to a display coupled to the server device node).

In the embodiment of FIG. 13, the device property for the device dashboard is set to "designer" so that the device dashboard module (and dashboard elements contained therein) is parsed into the sub-schematic for the virtual device, which is executed on the computer node (server). The tab property for the device dashboard is set to the distinct identifier of "Device." As such, the device dashboard is presented under the "Device" tab in the system dashboard executed with in virtual device. The system dashboard is executed in the separate "Designer" tab so as to avoid confusing when designing and testing each dashboard via the design computer.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the claims below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

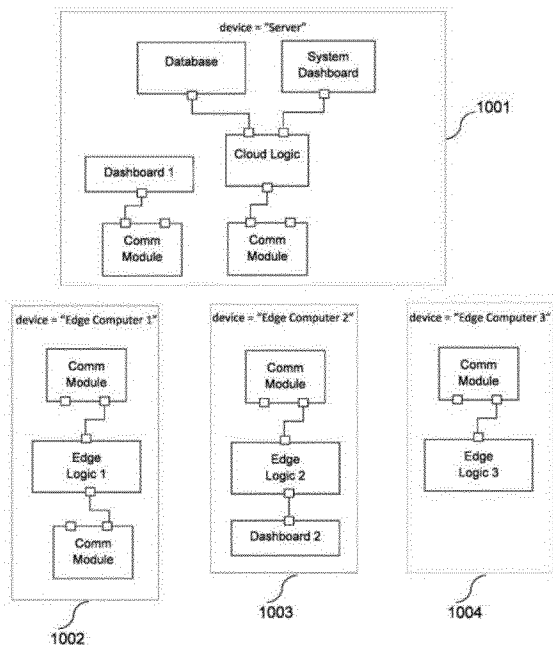

What is claimed is:

1. A computer-implemented method of characterizing and controlling performance of a set of device nodes in a distributed heterogeneous computing and control system, the distributed system having a plurality of device nodes in physically distinct locations, in communication with one another over a network, wherein the set of device nodes in the system requires different application programming code due to differences in hardware configuration or software configuration, the method comprising:

receiving, by the design computer, a selection of a set of modules and ordering them in a manner to characterize a computer application, designed for implementation in the distributed system, as a system schematic of the set of the device nodes in the distributed system, wherein each distinct one of the device nodes has a distinct device identifier, and wherein at least some of the modules are dashboard instances;

wherein a given dashboard instance, located in a given device node, is assigned a device identifier associated with the given device node and the given dashboard instance is configurable to cause display of data from any device node selected via the design computer;

parsing, by the design computer, the system schematic, utilizing device identifiers for the device nodes, to produce a set of sub-schematics of the application, wherein each sub-schematic corresponds to one of the set of device nodes;

configuring, by a design computer, for introduction into each one of the set of device nodes, a corresponding communication; and introducing, by the design computer, each sub-schematic and corresponding communication facility into the corresponding one of the set of device nodes, wherein, after introduction of the corresponding communication facility, the design computer includes a communication facility in communication with the corresponding communication facility of each device node.

2. A method according to claim 1, wherein the given dashboard instance includes a set of dashboard elements configured to cause display of the data from the selected device node.

3. A method according to claim 2, wherein each dashboard element is a graphical component selected from the group consisting of a line chart, a bar graph, a pie chart, a table, a gauge, a text field, a dialogue box, a date selector, and combinations thereof.

4. A method according to claim 1, wherein
the system schematic being hierarchical and including all elements in all hierarchies, and the dashboard instances can exist at any level of the hierarchies.

5. A method according to claim 1, wherein the given dashboard instance is assignable to a plurality of device nodes, wherein each assigned device node is indicated by its device identifier.

6. A method according to claim 1, wherein, if a plurality of the dashboard instances is assigned to a same one of the device nodes, causing, by the design computer, display of each dashboard instance on a tab corresponding to such dashboard instance.

7. A method according to claim 6, wherein, if a plurality of the dashboard instances is assigned to a same one of the device nodes, causing, by the design computer, display of each dashboard instance on a distinct tab corresponding to such dashboard instance.

8. A method according to claim 1, wherein the design computer has a virtual device node, and the given dashboard instance is assignable to the virtual device node, wherein the virtual device node is indicated by its device identifier.

9. A method according to claim 1, wherein each dashboard instance is connected to a data module that includes the data of which such dashboard instance causes display, and the data module is assigned a device identifier from the selected device node.

10. A method according to claim 9, further comprising, if the selected device node is distinct from the given device node in which the given dashboard instance is located, causing transmission of the data (i) from a communication facility in the selected device node (ii) to a communication facility in the given device node.

\* \* \* \* \*

UNITED STATES PATENT AND TRADEMARK OFFICE
CERTIFICATE OF CORRECTION

| | |
|---|---|
| PATENT NO. | : 11,003,850 B2 |
| APPLICATION NO. | : 16/899986 |
| DATED | : May 11, 2021 |
| INVENTOR(S) | : Andrew Wang |

It is certified that error appears in the above-identified patent and that said Letters Patent is hereby corrected as shown below:

On the Title Page

Delete the printed fig. and replace with the printed fig. as shown on the attached title page.

In the Drawings

Replace Figures 2 and 6-10 with the attached Figures 2 and 6-10.

Signed and Sealed this
Third Day of May, 2022

Katherine Kelly Vidal
*Director of the United States Patent and Trademark Office*

(12) United States Patent
Wang

(10) Patent No.: US 11,003,850 B2
(45) Date of Patent: May 11, 2021

(54) METHOD AND SYSTEM FOR DESIGNING DISTRIBUTED DASHBOARDS

(71) Applicant: Prescient Devices, Inc., Groton, MA (US)

(72) Inventor: Andrew Wang, Groton, MA (US)

(73) Assignee: Prescient Devices, Inc., Groton, MA (US)

(*) Notice: Subject to any disclaimer, the term of this patent is extended or adjusted under 35 U.S.C. 154(b) by 0 days.

(21) Appl. No.: 16/899,986

(22) Filed: Jun. 12, 2020

(65) Prior Publication Data
US 2020/0313961 A1    Oct. 1, 2020

Related U.S. Application Data

(63) Continuation-in-part of application No. 16/431,966, filed on Jun. 5, 2019, now Pat. No. 10,685,155.
(Continued)

(51) Int. Cl.
*G06F 40/205* (2020.01)
*H04L 12/24* (2006.01)
(Continued)

(52) U.S. Cl.
CPC ........ *G06F 40/205* (2020.01); *G06F 3/0484* (2013.01); *G06F 9/451* (2018.02); *H04L 41/0803* (2013.01); *G06F 8/38* (2013.01)

(58) Field of Classification Search
CPC ........ G06F 17/00; G06F 16/00; G06F 16/26; G06F 3/0484; G06F 8/38; G06F 9/451; G06F 9/54; G06F 40/205; H04L 41/0803
See application file for complete search history.

(56) References Cited

U.S. PATENT DOCUMENTS 5,640,546 A   6/1997  Gopinath et al.
5,870,588 A   2/1999  Rompaey et al.
(Continued)

OTHER PUBLICATIONS

International Searching Authority—Invitation to Pay Additional Fees—International Application No. PCT/US2019/035502 dated Aug. 21, 2019, together with the Provisional Opinion Accompanying the Partial Search Result, 14 pages.
(Continued)

*Primary Examiner* — Helen Rossoshek
(74) *Attorney, Agent, or Firm* — Sunstein LLP

(57) ABSTRACT

A computer-implemented method characterizes and controls performance of a set of device nodes in a distributed heterogeneous computing and control system. The device nodes are in physically distinct locations, in communication with one another over a network. One or more of the device nodes require different application programming code due to differences in hardware configuration or software configuration. The method includes configuring, by a design computer, for introduction into each distinct one of the device nodes, a corresponding communication facility and a corresponding dashboard instance. After introduction of the communication facility and dashboard instance into each device node, the design computer includes a communication facility in communication with the corresponding communication facility of each device node. Any given dashboard instance, either in the design computer or one of the device nodes, is configurable to display data and control elements associated with a selected one of the device nodes.

10 Claims, 13 Drawing Sheets